UNITED STATES PATENT OFFICE.

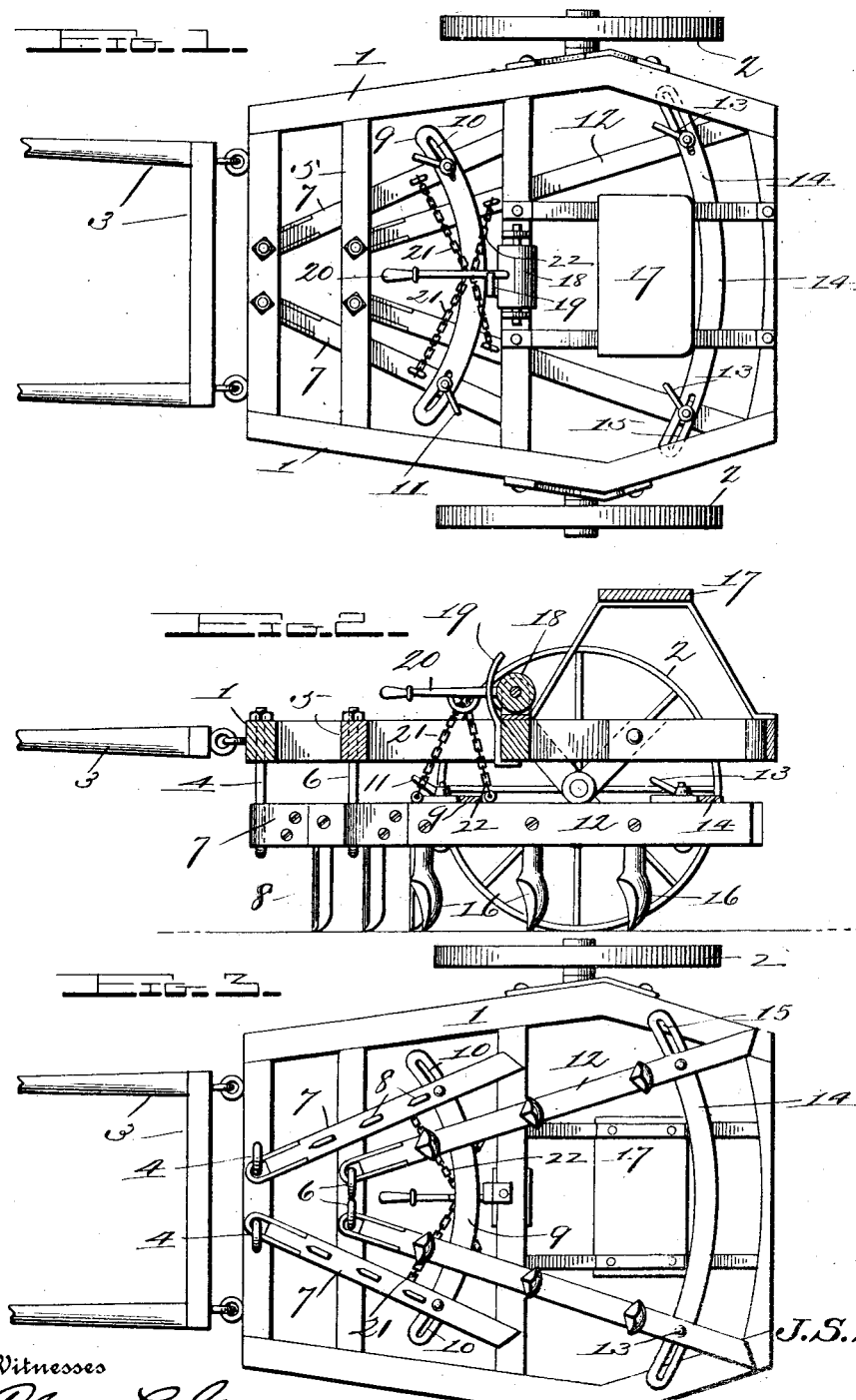

JOHN S. SMITH, OF BURLINGTON, WISCONSIN.

CULTIVATOR.

1,157,433.  Specification of Letters Patent.  Patented Oct. 19, 1915.

Application filed May 1, 1914. Serial No. 835,756.

*To all whom it may concern:*

Be it known that I, JOHN S. SMITH, a citizen of the United States, residing in Burlington, in the county of Racine and State of Wisconsin, have invented new and useful Improvement in Cultivators, of which the following is a specification.

This invention relates to a cultivator provided with cutting devices traveling parallel to the cultivator blades and positioned so that they will cut the sod, roots or a hard crust in advance of the respective cultivators, thereby relieving the cultivators of the work of breaking up such sod or crust, thereby greatly reducing the draft and making it possible to work ground with one horse while with devices of the ordinary type it would require two horses. My invention can also be used in connection with a team, by making the same of such size that it will straddle the rows.

One of the improved features of my invention is the manipulation of the knives and cultivators with a common lever, as to be effective they must work together.

The invention consists of the novel features of construction hereinafter described, pointed out in the claim and shown in the accompanying drawings, in which:

Figure 1 is a plan view. Fig. 2 is a vertical section taken on the central longitudinal line of the device. Fig. 3 is an inverted plan view.

In these drawings 1 represents a suitable frame mounted upon wheels 2 and provided with any suitable form of draft as indicated at 3. The front of the frame 1 carries a depending yoke 4, and adjacent the front is arranged a cross bar 5 which carries a depending yoke 6 in longitudinal alinement with the yoke 4.

Pivotally and slidably mounted upon the yoke 4 are beams 7. Said beams carry cutting implements 8, a segment 9 connects the rear portions of the beams 7, said segment being slotted as shown at 10, and the beams being locked to the segment 9 by thumb nuts 11. The slots allow for adjustment of the beams thereby permitting them to be brought closer together or spread farther apart as circumstances may require.

To the yoke 6 are pivotally and slidably connected beams 12 locked by wing nuts 13 to a segment 14 concentric with the segment 9, of greater length and arranged adjacent the rear of the frame 1. This segment is provided with slots 15 thereby permitting adjustment of the beams 12, and it will be noted that this construction permits the adjustment of any one of the four beams independent of any of the others. The beams 12 carry cultivators 16 of any desired kind.

A suitable seat 17 is arranged upon the frame 1 and in advance of said seat is a drum 18 in front of which is arranged a slightly curved rack bar 19 over which works a lever 20 carried by the drum 18.

Suitable chains 21 are secured respectively to the levers and to the beams 7 and the chains 22 are secured to the beams 12 and to the lever, or if desired chains can be secured to the drum and wind thereupon. By this means both beams 7 and both of beams 12 are lifted or lowered at the same time and to the same extent.

With a device of this kind a sod, weed roots or a thick crust will be cut up in advance of the cultivators so as to relieve the cultivators of this work and leave them free to perform the work which properly belongs to them. This greatly facilitates the putting of the ground in the proper mellow friable condition necessary for a seed body.

What I claim is:—

A device of the kin described comprising a wheel frame, depending yokes in longitudinal alinement, a pair of beams pivotally and slidably mounted upon said yokes respectively, said beams being independently adjustable in a horizontal plane, and simultaneously adjustable in a vertical plane, implements carried by one pair of beams and implements carried by the other pair of beams.

JOHN S. SMITH.

Witnesses:
 FRANK STANG,
 LOUIS F. REUSCHLEIN.